United States Patent [19]
Arai et al.

[11] Patent Number: 5,418,721
[45] Date of Patent: May 23, 1995

[54] CONTROL DEVICE FOR TRANSMISSION OF SUPERVISORY CONTROL DATA IN VEHICLE

[75] Inventors: Youichi Arai; Kazuyoshi Ogasawara, both of Shizuoka, Japan

[73] Assignee: Yazaki Corporation, Tokyo, Japan

[21] Appl. No.: 199,886

[22] Filed: Feb. 22, 1994

[30] Foreign Application Priority Data

Feb. 23, 1993 [JP]  Japan .................................. 5-033088

[51] Int. Cl.⁶ ....................... G01M 15/00; H04J 15/00
[52] U.S. Cl. ........................ 364/424.04; 364/424.03; 364/138; 307/9.1; 307/10.1
[58] Field of Search ............ 364/424.04, 431.11, 364/431.12, 709.06, 131, 133, 138, 514; 395/200; 371/20.1, 22.5, 30, 48, 68.1; 240/825.05, 825.06; 370/85.1, 95.2; 307/10 R

[56] References Cited
U.S. PATENT DOCUMENTS

| | | | |
|---|---|---|---|
| 4,654,890 | 3/1987 | Hasegawa et al. | 370/85 |
| 4,745,596 | 5/1988 | Sato | 370/85 |
| 4,760,275 | 6/1988 | Sato et al. | 307/10 R |
| 4,939,725 | 7/1990 | Matsuda et al. | 370/85.1 |
| 4,951,281 | 8/1990 | Muto et al. | 370/95.2 |
| 5,003,457 | 3/1991 | Ikei et al. | 364/133 |
| 5,056,023 | 10/1991 | Abe | 364/424.03 |
| 5,168,272 | 12/1992 | Akashi et al. | 340/825.05 |
| 5,299,194 | 3/1994 | Ichii et al. | 340/825.16 |

*Primary Examiner*—Kevin J. Teska
*Assistant Examiner*—Tan Nguyen
*Attorney, Agent, or Firm*—Finnegan, Henderson, Farabow, Garrett & Dunner

[57] ABSTRACT

A data transmission control device is provided for each of a plurality of units for controlling transmission of supervisory control data. Each control device includes a data error checking unit which causes a data reception unit to transmit a response signal when an error has been detected in the data by the data error checking unit. If a response signal detecting section in the transmitting unit detects a response signal, a data transmission unit resends the common data.

2 Claims, 5 Drawing Sheets

CONTROL DEVICE FOR TRANSMISSION OF SUPERVISORY CONTROL DATA IN VEHICLE

BACKGROUND OF THE INVENTION

1. Field of the Invention

The present invention relates to a data transmission control device for controlling transmission of supervisory control data among a plurality of divided units in vehicles.

2. Description of the Prior Art

There have been required a large number of control signals to drive an automotive safely and comfortably, and individual signal buses formed by wire harnesses have been adopted heretofore for the transmission of these control signals.

However, since the wire harnesses differ from one another depending on the type of each vehicle and extremely numerous number of signal busses are required nowadays, there has been developed a control system wherein various supervisory control equipments and each unit respectively connected thereto are divided into a plurality of ranges in accordance with the location and function thereof, wherein signal data between the supervisory control equipments and each unit respectively connected thereto in each of the divided ranges are transmitted by way of individual signal busses, while signal data among each of the units in different ranges are transmitted by way of a multiple-signal data bus.

For example, there is disclosed a control system adopted in an automotive heretofore in FIG. 3, which system being divided into 8 different ranges respectively having different units; an engine unit 21, an instrument panel units 22, a console unit 23, a right and a left cowl units respectively 24 and 25, a right and a left door units respectively 28 and 27, and a trunk unit 28, wherein a data transmission among each of the units is performed by way of a multiple-signal data bus 10, and each unit is connected to supervisory control equipments in each of the divided ranges by way of individual signal busses. For example, a horn switch to make a horn sound is connected to the instrument panel unit 22, while a power switch to set on and/or off a power supply to make a horn sound is connected to the engine unit 21, wherein when the horn switch is set to on, the "on" signal is transmitted to the engine unit 21 to make a horn sound.

In FIG. 4, there is shown a frame structure of a signal for transmitting signal data among the different units, which frame being constructed by an SOF signal indicating that this is the first signal of the frame, a PRI signal indicating the priority of the data, a DADR signal showing a destination address to which the data is to be transmitted, a SADR signal showing a source address from which the data is sent, a CRC check signal for checking whether or not the transmitted data is correct, an EOD signal indicating the end of the data, a RES signal showing a response with respect to the transmitted data, and an EOF signal indicating the end of the frame. These signals are all represented by binary digits "1" or "0" and the signal "1" and "0" are distinguished from each other by a PWM (Pulse-width Modulation) as shown in FIG. 5, wherein with respect to one-bit length of a data, when an electric voltage is maintained for one-third of the one-bit length, it is defined as "1", whereas when an electric voltage is maintained for two-third of the one-bit length, it is defined as "0".

When a request for data transmission is generated, each of the units certifies that the multiple-signal data bus 10 is in an idle state, which means that there is no data transmission being performed between other units, and then sends data with a frame structure as described in FIG. 4 to the multiple-signal data bus 10.

Each of the units keeps detecting the signals being transmitted in the multiple-signal data bus 10, and when the DADR of the transmitted data coincides with the address number of the unit itself that has detected the signal, and if there is no error detected in accordance with the CRC check signal, then the unit sends back an ACK signal in the bit for RES signal, whereas the unit sends back a NAC signal if an error is detected. It should be noted that the unit sends back the address of itself as the ACK signal.

When the unit that has sent the data (hereinafter referred to just as a source unit) receives a NAC signal in the bit for RES signal from the unit that has sent back the NAC signal (hereinafter referred to just as a destination unit), the source unit sends the same data again until an ACK signal is sent back thereto from the destination unit. By the way, since the multiple-data signal bus 10 is commonly used by each of the units, there is an occasion that a plurality of units simultaneously send data to the multiple-signal data bus 10, and in such a case, an arbitration to decide which of the units can use the data bus 10 can be performed through a contention mode.

There is shown an example of the contention mode in FIG. 6, wherein when a "1" is sent from unit A, and "0" is sent from unit B simultaneously, then a signal selected by the multiple-signal data bus will be "0". Accordingly, each unit monitors the value of the signal in the multiple-signal data bus, and stops sending the signal therefrom when the signal that the unit has sent and the signal in the multiple-signal data bus do not coincide with each other. In the case shown in FIG. 6, unit A stops sending the data.

As mentioned heretofore, in the conventional data transmitting method between the units, when the data received by a destination unit has no error therein, an ACK signal is sent back therefrom to the source unit, whereas when an error is discovered in the received data, a NAC signal is sent back, wherein an arbitration for the multiple-signal data bus is decided by the contention mode.

However, there are also data which should be received by a plurality of supervisory control equipments. For example, there are equipments which should operate only when the engine is in operation, but stop the operation thereof in connection with a stoppage of the engine and cut electric power supply thereto from a battery. For transmitting the same data to a plurality of supervisory control equipments in different ranges, there is also a method for transmitting the same data simultaneously to a plurality of units other than a method for transmitting the data to each of these units differently one after another.

For example, it is easy to put a specified address signal in the bit for a destination address DADR to indicate that the data is a common data to a plurality of units and when the data with this specified address is transmitted, each of the units defines it as a data for itself and processes it therein.

However, since an arbitration for the multiple-signal data bus is made by a contention mode, even in the case that a data with a specified address in the DADR is transmitted, resending of the data is executed in accordance with a response signal of only a contended unit. In other words, if the unit which has received a data with an error therein loses the contention for the multiple-signal data bus, a resending of the data thereto cannot be done, and thus no correct data will be transmitted afterwards.

SUMMARY OF THE INVENTION

The present invention has been made to eliminate such a problem as described above, and it is an object of the present invention to provide a control device in each unit for controlling transmission of supervisory control data, which is capable of securely transmitting correct data to a plurality of destination units even when there is an error in the data common to a plurality of units.

In order to solve the aforementioned problem, the present invention provides a data transmission control device for controlling a transmission of supervisory control data generated by a plurality of supervisory control equipments controlling each of a plurality of divided units, wherein the data transmission control device is contained in each of the units, which unit comprising; (a) a response signal detecting section to detect a response signal transmitted from another unit when the data to be transmitted is a common data to a plurality of units, (b) a data transmission controlling section for resending the common data when the response signal detecting section has detected a response signal from another unit, (c) a data error checking section for checking an error in the common data transmitted from another unit, and (d) a data reception controlling section for transmitting a response signal only when the data error checking section has detected an error in the transmitted data.

The response signal detecting section detects whether or not a data transmitting unit (hereinafter referred to just as a source unit) has received a response from another unit that has sent it (hereinafter referred to just as a destination unit). In the case that the response signal detecting section of the source unit that has sent a common data to a plurality of other units has detected a response from a destination unit, the data transmission controlling section resends the same common data to this destination unit. In case an error is detected by the data error checking section of the unit which has received a common data transmitted from the source unit, the data reception controlling section thereof sends a response signal back to the source unit.

As mentioned hereinabove, in case of transmission of a data common to a plurality of destination units, only when an error is detected in the transmitted data by a destination unit that has received it, the destination unit transmits a response signal to the source unit, and the source unit which has received the response resends the same data to the destination unit, whereby even when a contention for the multiple-signal data bus occurs, a response signal is sent back to the source unit, so that the once transmitted common data can be securely resent again.

Other objects and features of the invention will be more fully understood from the following detailed description and appended claims when taken in conjunction with the accompanying drawings.

DETAILED DESCRIPTION OF THE PREFERRED EMBODIMENTS

Figure 1:
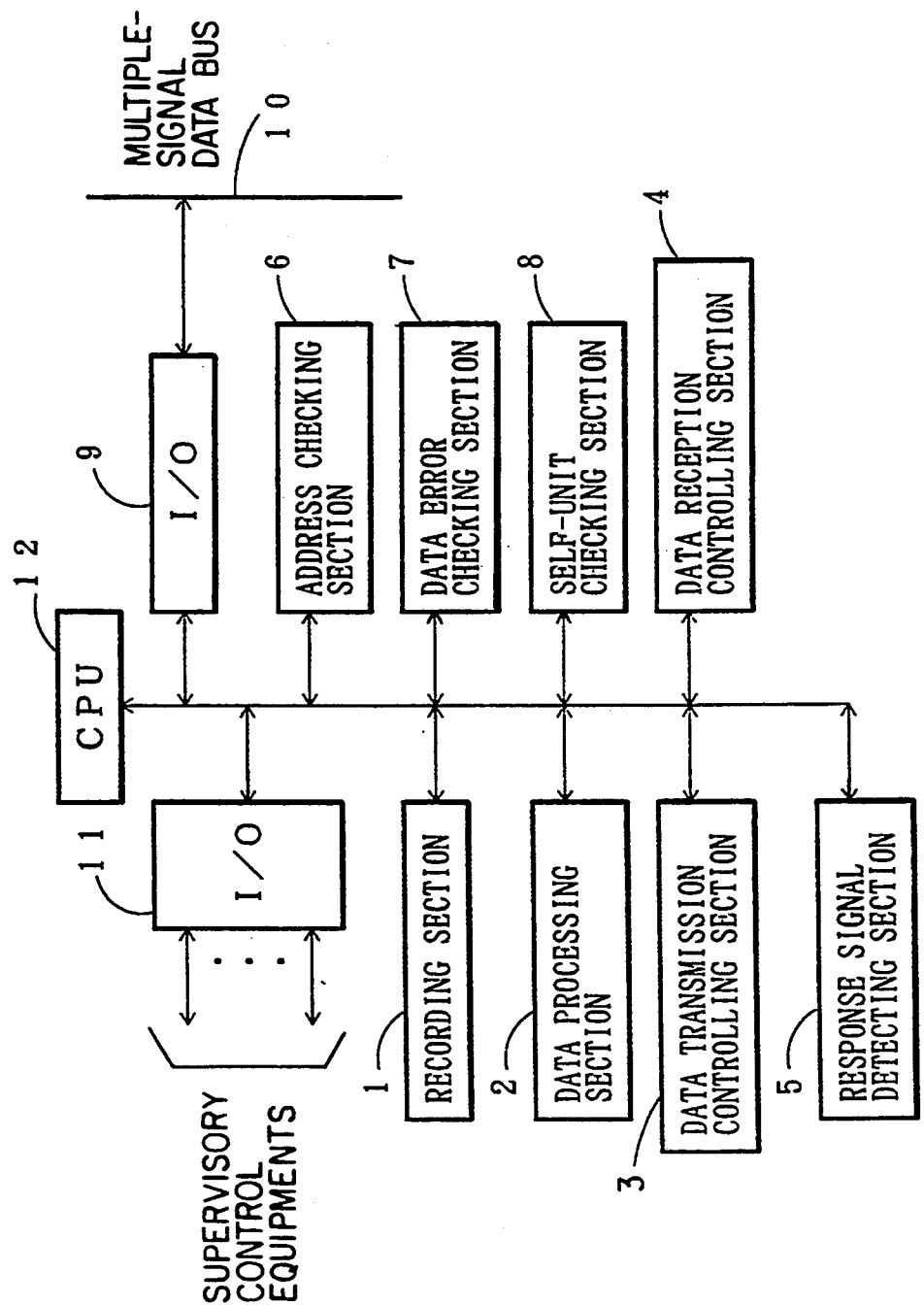
FIG. 1 is a block diagram showing a structure of one embodiment of the present invention.
Figure 2:
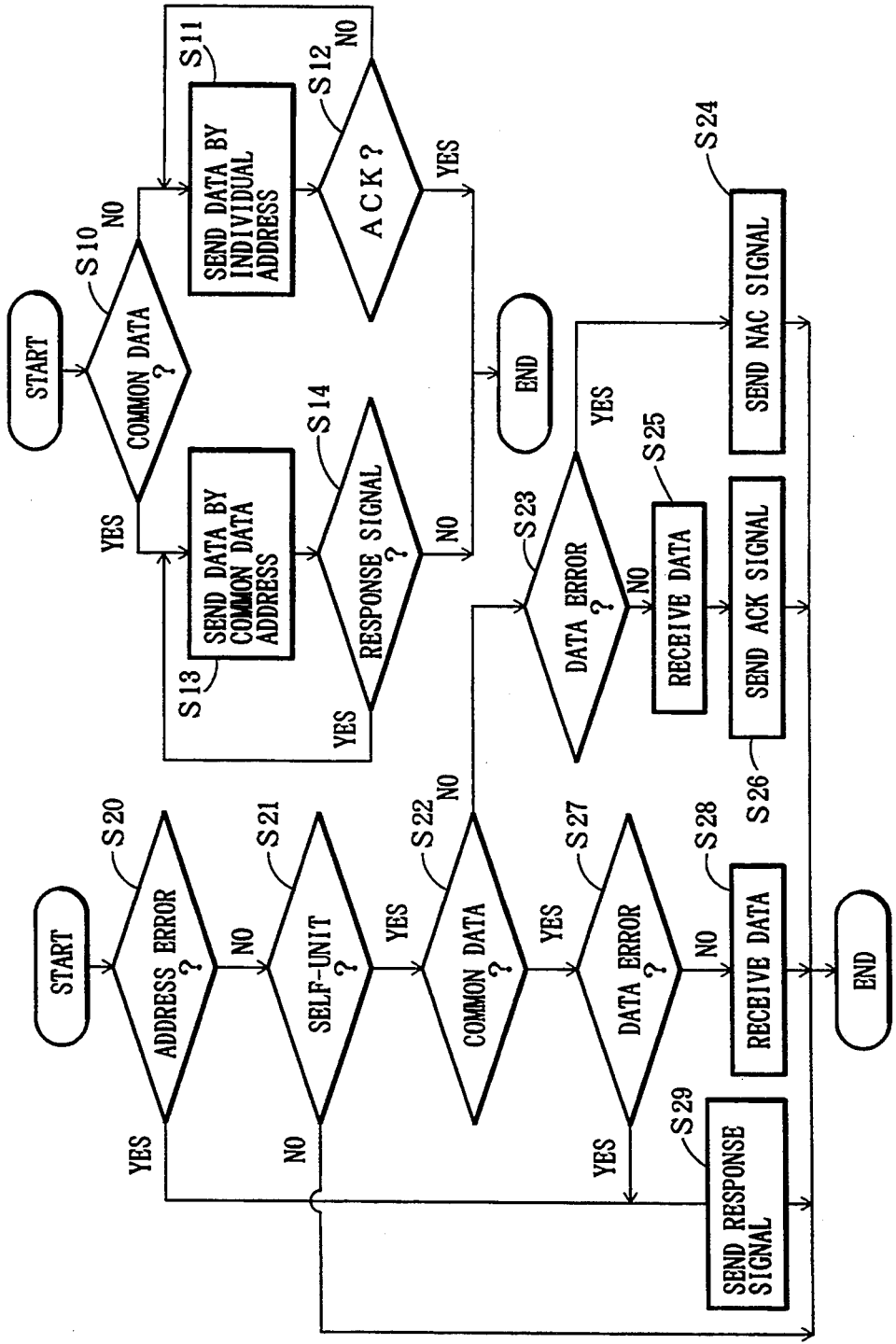
FIG. 2A is a flowchart showing an operation of a source unit that sends a data in the embodiment of FIG. 1.
FIG. 2B is a flowchart showing an operation of a destination unit that receives a data in the embodiment of FIG. 1.

In the following, a structure of the present invention will now be described with reference to the accompanying drawings, wherein FIG. 1 shows a construction of one embodiment of the present invention, and FIGS. 2A and 2B are flowcharts respectively showing the operation of a source unit and that of a destination unit.

Figure 3:
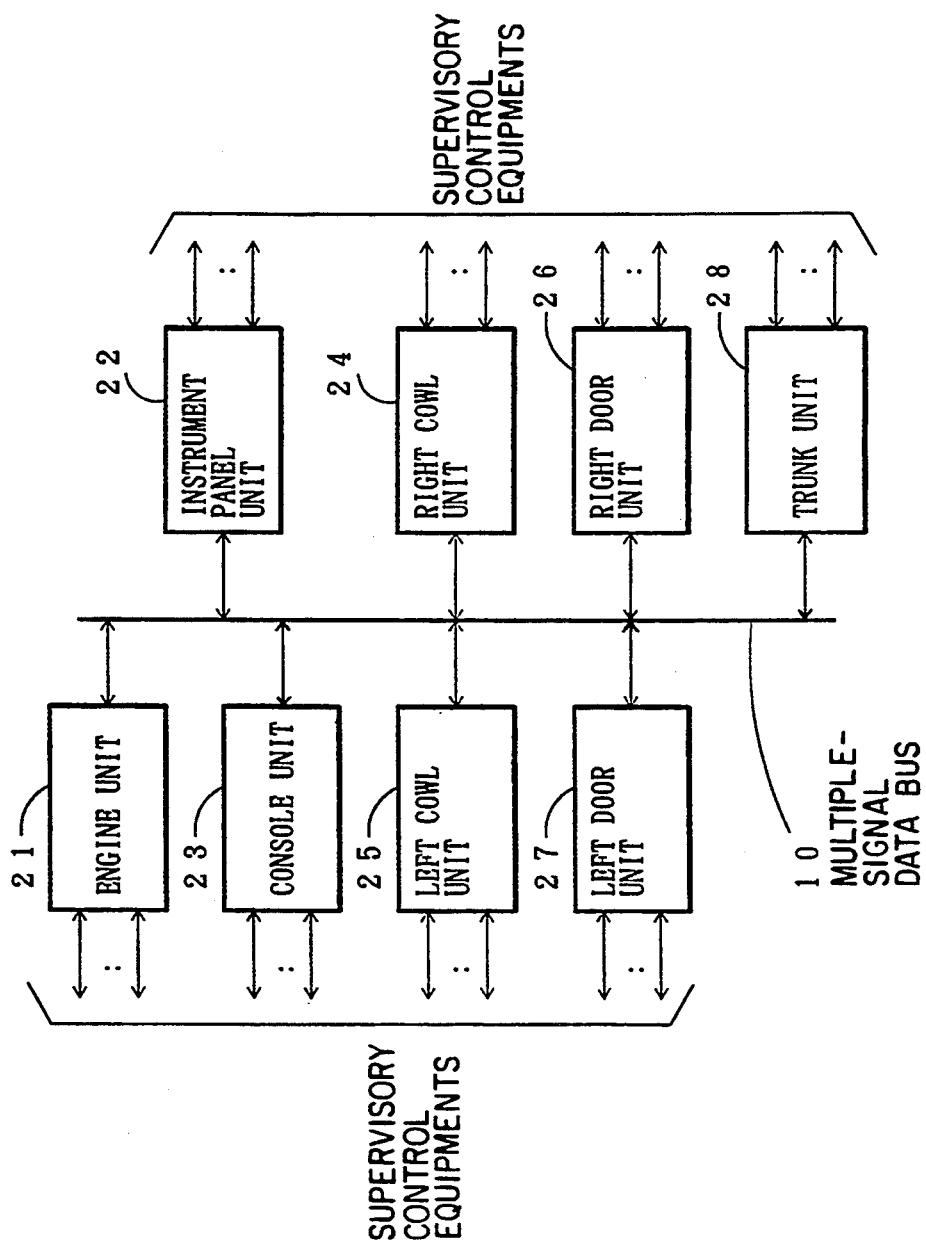
FIG. 3 is a block diagram showing a control system to which the present invention is applied.

The structure shown in FIG. 1 corresponds to each of the units in the control system illustrated in FIG. 3, and here is shown only one unit representing other units having the same structure. In the figure, reference numeral 1 denotes a recording section for recording supervisory control data, numeral 2 denotes a data processing section, 3 a data transmission controlling section for controlling a data transmission to a multiple-signal data bus 10, 4 a data reception controlling section for controlling a data reception through the multiple-signal data bus 10, 5 a response signal detecting section for detecting a response signal from another unit, 8 an address error checking section for detecting an error in the destination address, 7 a data error checking section for detecting whether there is any error in the transmitted data, 8 a self-unit detecting section for checking whether the transmitted data is for the self-unit, 9 an interface (I/O) to multiple-signal data bus 10, 11 an I/O interface to supervisory control equipments, and 12 a processor for executing the all processes (CPU).

Referring now to FIGS. 2A and 2B, an operation in the embodiment is explained. It is to be noted that FIG. 2A indicates an operation executed in the source unit, whereas FIG. 2B indicates an operation executed in the destination unit.

In FIG. 2A, the procedure starts when a request for a data transmission is generated from another unit.

In step S10, it is judged by a data transmission controlling section whether or not the data to be transmitted is a common data to a plurality of other destination units, and if the judgment is YES, then the procedure advances to step S13, and if NO, then the procedure advances to step S11.

Figure 4:
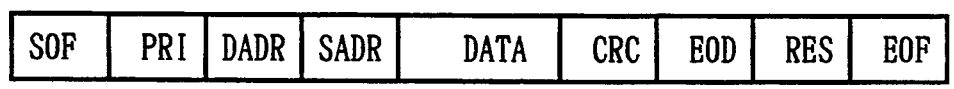
FIG. 4 is an illustration showing a signal frame construction in which a data is transmitted.
Figure 5:
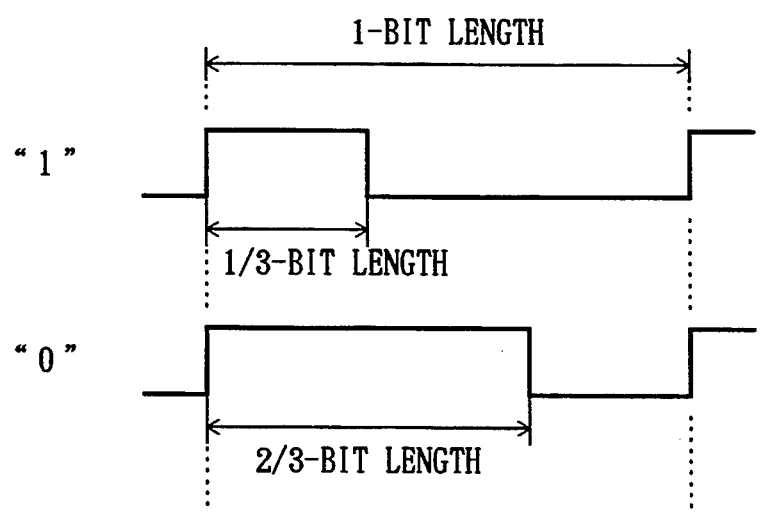
FIG. 5 is an illustration showing an explanatory view of a signal being sent in a multiple-signal data bus.
Figure 6:
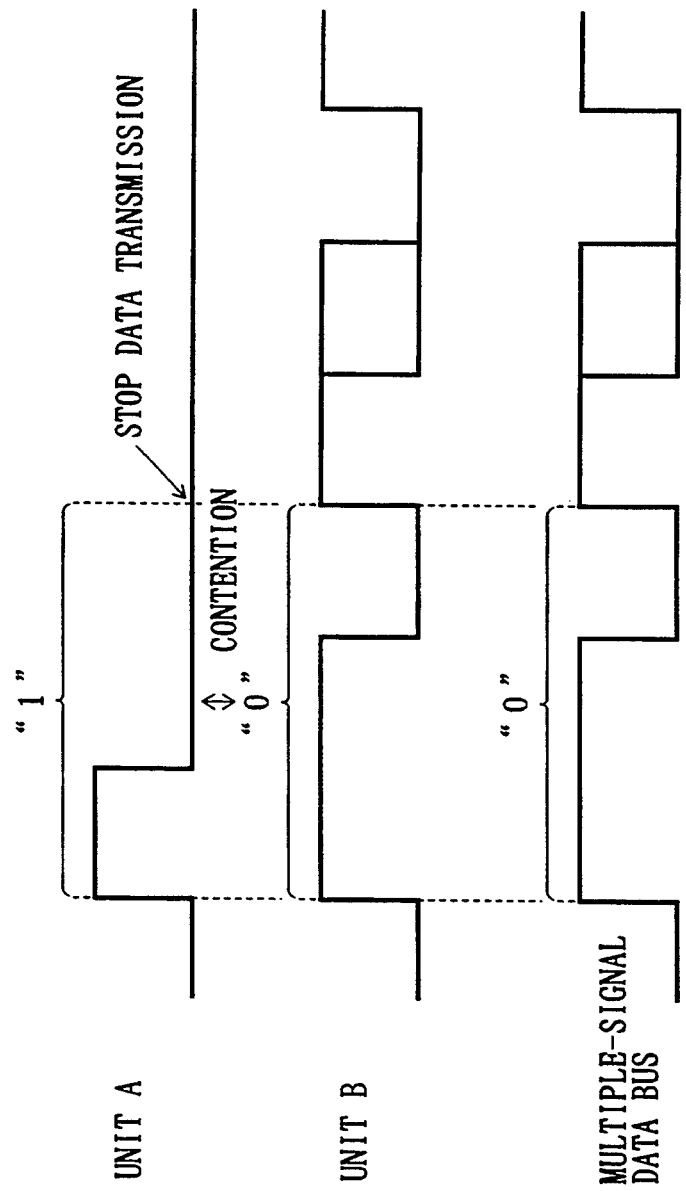
FIG. 6 is an illustration showing an arbitration between two units for the multiple-signal data bus.

When the judgment in step S10 is No, which means that the data is to be transmitted to only one unit, then in step S11, the data transmission controlling section 3 transmits the data with the destination address as set in FIG. 4 to the multiple-signal data bus 10 through an I/O interface 9. Thereafter, when an ACK signal is detected in the bit for a response signal RES explained in FIG. 4 in the data sent back thereto from the multiple-signal data bus 10 through the I/O interface, the procedure terminates here, whereas when a NAC signal is detected instead of ACK signal, then the procedure goes back to step S11 to repeat the procedure performed in steps S11 and S12.

On the other hand, if the judgment in step S10 is YES, which means that the data is to be transmitted to a plurality of destination units, then in step S13, the data transmission controlling section 3 transmits the data with a specified address indicating that the data is common to a plurality of units set in the bit for a destination address DADR to the multiplex-signal data bus 10 through I/O 9. Thereafter, in step S14, a response signal detecting section 5 detects whether or not a response signal in the bit for a response signal RES as explained in FIG. 4 in the data sent back thereto and if the answer is YES, then the data transmission controlling section 3 resends the data, while if the answer is NO, the procedure then terminates here.

Referring now to FIG. 2B, an operation of the destination unit is explained. When a data is transmitted to the multiple-signal data bus 10, the data bus 10 is no longer in an idle state, and when the destination unit has detected this state of the data bus, the procedure starts. In step S20, it is judged by an address error checking section 6 whether or not there is any error in the data in the bit for DADR signal transmitted from the multiplex-signal data bus 10 through the I/O interface 9 as explained in FIG. 4, and if the judgment is YES, then the procedure advances to step S29 and the data reception controlling section 4 sends back a response signal using a bit for a response signal RES, whereas if the judgment is NO, then the procedure advances to step S21. It is to be noted that a detection of an error in the DADR signal in step S20 can be executed by a parity check or the like. Thereafter, in step S21, the self-unit detecting section 8 detects whether the transmitted data is for itself, and if the judgment is NO, which means that the data is for another unit, then the procedure terminates here, whereas if the judgment is YES, which means that the data is either for itself or for a common data for other units as well, then the procedure advances to step S22, and if it is detected in step S22 that the data is a common data, the procedure advances to step S27, while if the data is only for itself, the procedure advances to step S23.

In step S23, a data error checking section 7 detects whether or not there is any error in the transmitted data by a CRC check, and if there is detected an error, then the data reception controlling section 4 sends back a NAC signal and terminates the procedure here, whereas if there is no error detected, then the transmitted data is received in step S25, and sends back an ACK signal in the following step S26.

On the other hand, if the self-unit detecting section 8 detects in step S22 that the data is a common data to a plurality of other units, then the procedure advances to step S27. In step S27, a data error checking section 7 detects whether or not there is any error in the transmitted data and if no error is detected, then the data is received in step S28, whereas if an error is detected therein, then the data reception controlling section 4 sends back a response signal using a bit for a response signal RES and terminates the operation here.

By the way, it is to be noted that the reason for checking whether there is an error in the destination address DADR in step S20 is because if the data is a common data to a plurality of other units and the DADR signal with an error is received, then normally it is judged that the data is not for itself, and thereby the data is not correctly received. This step S20 exists for avoiding the occurrence of this fact, whereby even if there is an error in the address signal, a response signal is definitely sent back to the source unit, so that a data with a correct address is resent thereto.

Further, although in this embodiment an error detection in the destination address DADR is executed by a parity check, it can be easily detected by constructing the address number thereof only with a number in connection with the parity rule.

And still further, in the embodiment a response signal can be transmitted in step S29; but this response signal can be a NAC signal outputted in step S24.

Although an embodiment of the present invention has been explained heretofore, the present invention is not limited to this, and can variably be constructed in compliance with the subject of the present invention.

Effect of the Invention

As described heretofore, the present invention has following advantages as shown below:

(1) when a data common to a plurality of units is transmitted, the unit that has received the data sends back a response signal to the source unit only when there is an error detected in the received data, and when the source unit receives the response signal and resends the same data to the destination unit, even if the multiple-signal data bus is contended between a plurality of units, the response signal is securely sent back to the source unit, whereby the same data can be securely transmitted to the destination unit.

(2) Since it is detected whether or not there is an error in a destination address of the transmitted data, and a response signal is sent back to the source unit when an error is found therein, a common data to be transmitted to a plurality of units can be securely transmitted to the destination units.

Having now fully described the invention, it will be apparent to one of ordinary skill in the art that many changes and modifications can be made thereto without departing from the spirit and scope of the invention as set forth herein.

What is claimed is;

1. A data transmission control device for controlling a transmission of supervisory control data between a plurality of units in a vehicle, wherein said data transmission control device is contained in each of said units which are respectively connected to a plurality of supervisory control equipments, said control device in each unit comprising;

a data transmission controlling section for controlling a data transmission to another unit;

a data reception controlling section for controlling a data reception from another unit;

a response signal detecting section for detecting a response signal sent from another unit; and a data error checking section for checking whether there is any error in the transmitted data from another unit, wherein if a data to be transmitted between two different units is a common data for a plurality of units, said data reception controlling section in a data receiving unit transmits a response signal only when said data error checking section therein has detected an error, and said data transmission controlling section in a data sending unit resends the common data when said response signal detecting section therein has detected a response signal from said data receiving unit.

2. A data transmission control device as claimed in claim 1, wherein said data reception controlling section in said data receiving unit sends a response signal to said data sending unit also when said data reception controlling section has detected an error in the address number of said data receiving unit itself.

* * * * *